United States Patent [19]

Miller et al.

[11] Patent Number: 4,651,764

[45] Date of Patent: Mar. 24, 1987

[54] APPARATUS RESPONSIVE TO ENTRY INTO SPACE AND METHOD OF OPERATION THEREOF

[75] Inventors: John F. Miller, Ogden; Jesse F. Scivally; Robert B. Smalley, Jr., both of Brigham City, all of Utah

[73] Assignee: Morton Thiokol Inc., Chicago, Ill.

[21] Appl. No.: 752,329

[22] Filed: Jul. 3, 1985

[51] Int. Cl.⁴ .................... F16K 17/36; B67D 5/08
[52] U.S. Cl. ................................ 137/81.1; 251/63; 222/61
[58] Field of Search ............... 137/81.1, 81.2; 251/62, 251/63; 222/61

[56] References Cited

U.S. PATENT DOCUMENTS

| | | | |
|---|---|---|---|
| 1,557,822 | 10/1925 | Foulk | 137/81.1 |
| 2,690,669 | 10/1954 | Giladett | 137/81.1 |
| 2,725,956 | 12/1955 | Cunningham | 137/81.1 |
| 3,115,277 | 12/1963 | Montagive, Jr. | 222/61 |
| 3,713,458 | 1/1973 | Lee | 251/63 |
| 3,722,749 | 3/1973 | Ishida | 222/61 |
| 4,033,479 | 7/1977 | Fletcher et al. | 222/61 |
| 4,462,301 | 7/1984 | Goons | 137/81.1 |

OTHER PUBLICATIONS

Clark et al., "The Long Duration Exposure Facility (LDEF)", NASA Sp-473, 1984.

Primary Examiner—A. Michael Chambers
Attorney, Agent, or Firm—James C. Simmons; Gerald K. White

[57] ABSTRACT

Apparatus useful on space vehicles as a valve for establishing external pressure in a pressure container or otherwise as an engine for performing work. The apparatus is responsive to atomspheric pressure retained in a plenum are applied to one side of a piston which atomspheric pressure is greater than an external pressure applied to the other side of the piston in a vacuum environment. A method for operation of such apparatus is also disclosed.

18 Claims, 4 Drawing Figures

APPARATUS RESPONSIVE TO ENTRY INTO SPACE AND METHOD OF OPERATION THEREOF

The present invention relates to apparatus which is responsive to a change in external pressure from an atmospheric pressure to a vacuum for operation and a method of operation thereof. More particularly, the present invention relates to such apparatus as valves and engines which are vacuum actuated and which may be used on space vehicles such as the space shuttle for opening or otherwise performing work on entry into space.

A test container loaded with specimens is useful in such a space vehicle for the purposes of conducting tests on the specimens in a vacuum environment in space. Further, it may be desirable that the vacuum conditions of space be maintained in the test container during and after return of the space vehicle to earth.

The specimens for testing may sometimes include items such as propellants for the purposes of determining how such items may be affected by the space environment. In such a case, safety precautions require special handling and may also require that the test container be sealed and not exposed to the environment during handling thereof and loading onto the space shuttle and during the launch and re-entry processes.

The test container may of course be opened to space environment and then closed as desired by the use of manually or remotely operated means. However, it may be desirable to allow the test container to be opened and closed passively, that is, without the requirement of human intervention.

It is also necessary to perform work such as hook-ups of various linkages and movements of antennas into position upon movement of such a space vehicle into space and upon re-entry. Again, it may be desirable that such work be performed passively so as to free the available manpower for work on other tasks.

Pressure modulated flow control valves using pressure differentials are common. Those which utilize vacuum pressures require the presence of atmospheric external pressure to establish a pressure differential for operation and do not provide for storage of atmospheric pressure to establish a pressure differential for operation in space. Likewise, carburetors, which control flow rate by use of a velocity generated vacuum, rely on the presence of atmospheric external pressure to establish the pressure differential and do not provide for atmospheric pressure storage for operation in space. Thus, such devices, while very suitable for operation under atmospheric pressure conditions, would not be operable under space conditions where there would be an absence of atmospheric external pressure to provide the pressure differential necessary to operate them.

It is an object of the present invention to provide apparatus which is passively operated to establish opening of a test container or to otherwise perform work when the external pressure drops below an atmospheric pressure such as during entry of a space vehicle into space.

It is an object of an aspect of the present invention to provide such apparatus which is also operable passively to provide closure of the test container or to otherwise perform work when the external pressure, then a vacuum, thereafter increases such as during descent to Earth.

It is another object of the present invention to provide such apparatus which has a minimum number of moving parts.

It is yet another object of the present invention to provide such apparatus which is inexpensive, rugged, and reliable.

The above and other objects, features, and advantages of this invention will be apparent in the following detailed description of the preferred embodiments thereof which is to be read in conjunction with the accompanying drawings.

DESCRIPTION OF THE PREFERRED EMBODIMENTS

Figure 1:
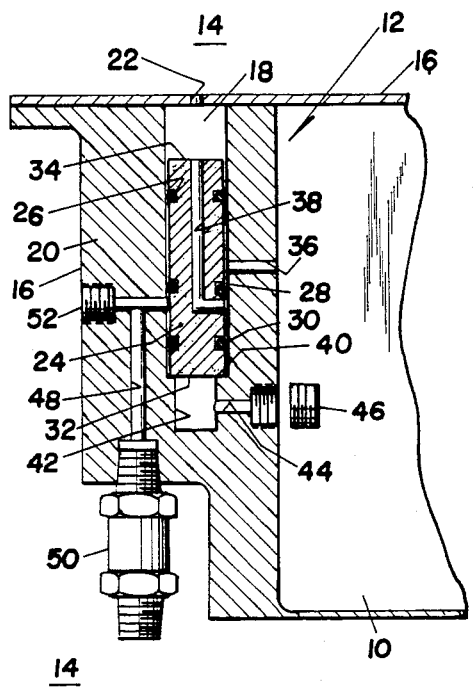
FIGS. 1 through 4 are sectional views, partly in elevation, of a valve embodying the present invention and a test chamber showing the sequence of operation thereof.

Referring to the Drawings, there is shown at 10 a test container which is a pressure vessel for containing specimens such as propellants, case materials, insulations, igniter components, composite materials, and epoxies, for subjecting the specimens to a space environment, i.e., a vacuum or partial vacuum, and for study of them in that environment.

Shown generally at 12 is a valve for controlling fluid flow between the external environment illustrated at 14 and the test container 10. Wall 16 separates the test container 10 and valve 12 from the external environment 14 thereof. By "external environment", as used herein and in the claims, is meant the surroundings in which the test container 10 and valve 12 and any apparatus attached thereto are located, and "external pressure" and "external environment pressure", as used herein and in the claims, refer to the pressure, whether a vacuum or atmospheric pressure or a pressure greater than atmospheric, in the external environment.

An elongate chamber or cylinder 18 is provided in the valve body 20 in pressure communication at one end with the external environment 14 such as via port 22 provided in the wall 16.

Figure 2:
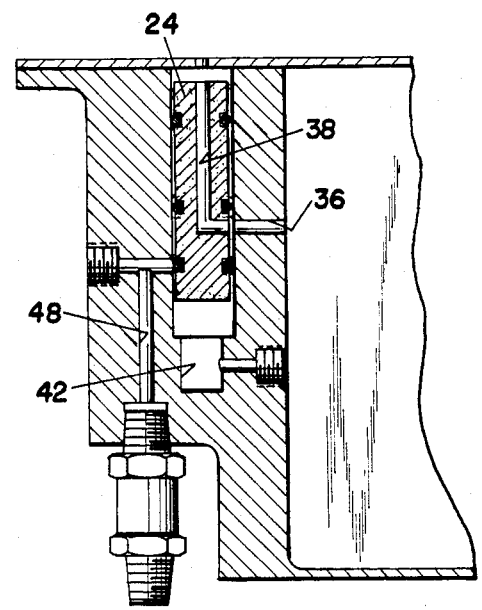
Figure 3:
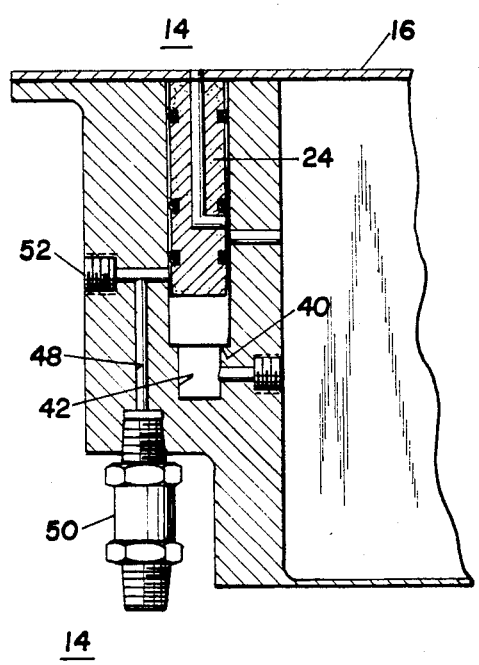

A piston 24 is disposed in the cylinder 18 and is movable over the length of the cylinder 18 between first, second, and third positions as illustrated in FIGS. 1, 2, and 3 respectively and as will be more fully described hereinafter. Spaced from each other along the length of the piston 24 are first, second, and third piston rings 26, 28, and 30 respectively beginning with the piston ring closest to the wall port 22 for providing sealing engagement between the piston 24 and the cylinder wall at corresponding points along the length of the piston. The piston 24 has a first side 32 for application of pressure at the end opposite the wall port 22 and a second side 34 in pressure communication with the external environment 14 such as via wall port 22 for application of external pressure thereto.

Figure 4:
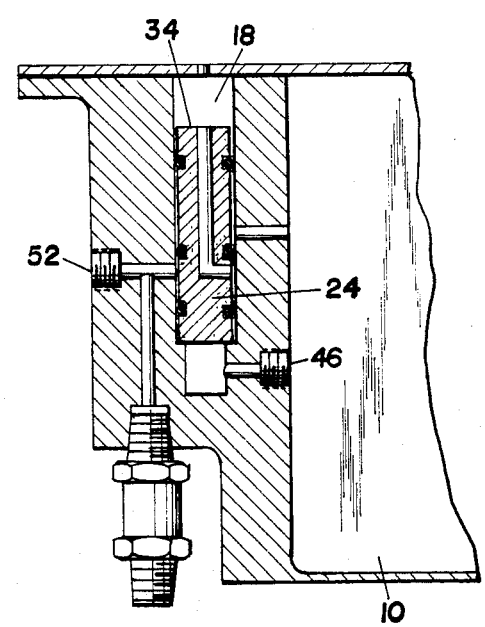

A container vent 36, herein referred to for convenience as a "first port", opens into and extends from the test container 10 to the cylinder 18 to open into the cylinder 18 at a point intermediate the first and second piston rings 26 and 28 respectively when the piston 24 is in the first position, as illustrated in FIGS. 1 and 4, and at a point intermediate the second and third rings 28 and 30 respectively when the piston 24 is in the second or third positions as illustrated in FIGS. 2 and 3 respectively.

A port 38, herein referred to for convenience as a "second port" is provided in the piston 24. It opens into and extends from the second piston side 34 axially inwardly of the piston 24 then radially to the piston surface to open into the piston surface at a point intermediate the second and third piston rings 28 and 30 respectively to provide a means for pressure communication between the test container 10 via the container vent 36 and the annulus in the cylinder 18 between the second and third piston rings 28 and 30 respectively on the one hand and the external environment 14 via the port 22 on the other hand when the piston 24 is in the second or third position, as illustrated in FIGS. 2 and 3 respectively. However, when the piston 24 is in the first position, as illustrated in FIGS. 1 and 4, the second piston ring 28 is positioned to seal the cylinder 18 against pressure communication between the first and second ports 36 and 38 respectively and to thereby effectively seal or close the test container 10.

At the opposite end of the chamber 18 from the wall port 22 is provided a shoulder 40 from which extends a plenum chamber 42 of smaller diameter (but not necessarily smaller diameter) than the chamber 18 and in pressure communication with the chamber 18 for application of pressure retained therein against the piston first side 32. A port 44, herein referred to for convenience as a "third port", opens into and extends from the plenum 42 through the valve body 20 to open into the test container 10, and a plug 46 is provided for sealing this third port 44 so as to trap or capture and retain pressure such as atmospheric pressure in the plenum 42. It should be noted, however, that it is not necessary that the third port 44 open into the test container 10. For example, the third port 44 may instead be routed so as to be in direct pressure communication with the external environment 14 before it is sealed by plug 46. The third piston ring 30 sealingly engages the cylinder wall to prevent escape of pressure in the plenum to either the container vent 36 or the piston port 38 at all positions of the piston 24, and to prevent escape of pressure in the plenum to the external environment via a fourth port 48 and check valve 50, which are described hereinafter, when the piston is in the first and second positions illustrated in FIGS. 1 and 2 respectively.

The port 48, herein referred to for convenience as a "fourth port", extends in the valve body 20 to a check valve 50 from the chamber 18 at a point on the plenum side of the third ring 30 when the piston 24 is in the third position, as illustrated in FIG. 3, at which point the fourth port 48 opens into the chamber 18 to afford pressure communication between the plenum 42 and check valve 50. The check valve 50 opens into the external environment 14 and allows flow only in a direction from the plenum 42 through the check valve 50 and into the external environment 14. When the piston 24 is in the first or second position, as illustrated in FIGS. 1 and 2 respectively, the fourth port 48 opens into the chamber 18 at a point generally between the second and third piston rings 28 and 30 respectively such that the sealing engagement of the third ring 30 against the cylinder wall seals the cylinder to prevent pressure communication between the fourth port 48 and the plenum 42. Permanently closed plug 52 is provided for sealing a portion of an aperture which may be required during manufacture of the valve 12 for the purposes of drilling a portion of the fourth port 48.

The operation of the valve 12 will now be described with reference to the drawings.

Referring first to FIG. 1, the valve is cocked by placing the piston 24 in the first or retracted position, as illustrated in FIG. 1, while the valve 12 is under an atmospheric pressure condition, for example, while the valve 12 and test container 10 are on the earth awaiting transport into space. The plug 46 is then installed in the control plenum port 44 to seal the control plenum port 44 and thereby retain a storage volume of atmospheric air in the control plenum 42 for valve actuation when the external pressure reaches a predetermined actuation level such as during transport into space. Since the valve 12 is in an atmospheric pressure environment prior to transport into space, there is atmospheric pressure at this time acting on both first and second sides 32 and 34 respectively of the piston. The second piston ring 28 is in position to prevent pressure communication between the test container 10 and the external environment 14, and the third piston ring 30 and plug 46 are in position to seal the plenum chamber 42 against the escape of the storage volume.

With the piston 24 in the first position, as illustrated in FIG. 1, the test container 10 is sealed for transporting it to a launch site and launching it into space or for other purposes for which it may be used. However, with equal pressures acting on both piston sides 32 and 34, there may be a tendency of vibrations or acceleration forces to prematurely cause movement of the piston 24 against the force of gravity toward the second position. In order to prevent such piston movement so that the piston may be maintained securely in the first position, it is preferred to provide that the pressure in the plenum 42 be slightly less than the external pressure at the launch site. For example, the plenum pressure may desirably be 1 to 3 psia less than the atmospheric pressure at the launch site. This may be accomplished by loading the storage volume of air in the plenum 42 at a high altitude location such as in the mountains of Utah where the elevation is in the range of 4,000 feet and the atmospheric presssure may typically be in the range of 12.5 psia as compared to a typical pressure of 14.7 psia at a low altitude launch site such as Cape Canaveral, Fla. However, the plenum pressure need only be high enough to cause actuation of the valve 12 by movement of the piston 24 to the second position, illustrated in FIG. 2, at the predetermined actuation pressure of the valve, that is, the predetermined external pressure at which the piston is caused to move to the second position by the difference in pressures between pressures acting on the the first and second sides 32 and 34 respectively of the piston. Therefore, for the purposes of this specification and the claims, the term "atmospheric pressure" is meant to include, in addition to pressures between about 11.7 psia and about 14.7 psia, any other pressure which is sufficient to cause movement of the piston 24 from the first to the second position at a predetermined external pressure for actuation thereof, but which is insufficient to cause movement of the piston 24 from the first to the second position until the external pressure is reduced to about the predetermined external pressure.

Referring to FIG. 2, the actuation pressure is reached when the external pressure is low enough to result in a pressure difference between the storage volume pressure contained in the plenum 42 and the external pressure which is sufficient to cause movement of the piston 24 to the second position such that the test container vent 36 opens into the cylinder 18 at a location between the second and third piston rings to thereby provide pressure communication between the test container 10 and the external environment 14. Thus, as the test chamber and valve are transported into space, the external pressure will continue to decrease until it reaches the predetermined actuation pressure such as, for example, a pressure of about 7 in. Hg. at about 35,000, feet, at which point the pressure difference between the piston sides 32 and 34 will be great enough to cause movement of the piston 24 to the second position. When the piston 24 is in the second position, there is pressure communication between the test chamber and the external environment, i.e, space, via the test container vent 36, the annulus in the cylinder between the second and third piston rings 28 and 30 respectively, the piston port 38, and the wall port 22 to establish the external environment conditions within the test container, i.e., a vacuum if the test container is in space.

For a return trip to earth, it may be desirable to seal the test container 10 from the external environment 14 in order to maintain the vacuum therein for continuation of the experiments on earth and/or for safety reasons during re-entry and landing. In order to cause movement of the piston 24 back to the first position so as to seal the test container 10 from pressure communication with the external environment 14, pressure is bled from the plenum 42 to establish a low pressure of perhapes 1½ inches Hg. therein. In order that this result be achieved, as the pressure in the external environment 14 becomes even less than the predetermined actuation pressure, the piston 24 is caused to move to the third position, illustrated in FIG. 3, wherein the fourth port 48 opens into the chamber 18 at a location between the third piston ring 30 and the first side 32 of the piston 24 to thereby provide pressure communication between the plenum 42 and the external environment 14 via the fourth port 48 and the check valve 50 which is set at a predetermined cracking pressure of, for example, 1½ inches Hg. to thus reduce the plenum pressure to that of the cracking pressure of the check valve 50 or to the external pressure, whichever is greater. Referring to FIG. 4, as the test container 10 and valve 12 descend back toward earth and into the earth's atmosphere, the increased external pressure at, for example, an altitude of 30,000 feet equal to a pressure of perhaps 8 inches Hg., being greater than the pressure in the plenum 42 after the piston 24 has moved to the third position, will cause movement of the piston 24 back to the first position to close and seal the container vent 36 and thereby maintain the space vacuum conditions therein as descent is made to earth.

It should be realized that the valve 12 of the present invention may be operable passively without manual intervention during an entire space flight and need utilize only two moving parts; that is, the check valve 50 and the piston 24 during the flight to thus provide ruggedness and reliability and reduced cost to the apparatus.

Although apparatus 12 has been described as a valve, it can also be used as an engine for performing various other kinds of work such as hooking-up various linkages and moving of antennas by attaching such items to the piston for movement therewith. Of course, if apparatus 12 is used as such an engine, it is unnecessary to provide the ports 36 and 38, and only one of the piston rings, for example, piston ring 30 need be provided so that the plenum can be sealed during entry into space and bled so that the piston may be moved back to the first position during a return flight.

It is to be understood that the invention is by no means limited to the specific embodiments which have been illustrated and described herein, and that various modifications thereof may indeed be made which come within the scope of the present invention as defined by the appended claims.

What is claimed is:

1. Apparatus responsive to change in external environment pressure for performing work, the apparatus comprises: a body; cylinder means in the body; piston means in said cylinder means which piston means has first and second sides and is responsive to a pressure applied to said first side which is greater than the external environment pressure for movement from a first to a second position to thereby perform work; plenum means for retaining an atmospheric pressure and applying the retained atmospheric pressure to said piston means first side; means for applying the external environment pressure to said piston means second side; and means including check valve means for bleeding pressure from said plenum means after said piston means has moved to the second position to provide a pressure less than atmospheric pressure in said plenum means for effecting movement of said piston means back to said first position upon an increase in the external environment pressure.

2. Apparatus according to claim 1 wherein said bleeding means includes port means in said body interconnecting said check valve means and said cylinder means for providing pressure communicatioon between said plenum means and said check valve means when said piston means is moved from said first position to at least said second position.

3. A method utilizing changes in external environment pressure for performing work, the method comprises the steps of:
   a. providing a cylinder having a piston responsive to a pressure applied to a first side thereof which is greater than the external environment pressure for movement from a first position to a second position;
   b. applying the external environment pressure to a second side of the piston;
   c. applying an atmospheric pressure to the first side of the piston with the piston in the first position and the external environment pressure equal to an atmospheric pressure;
   d. effecting a decrease in the external environment pressure that such the pressure difference between the pressure applied to the first and second piston side effects movement of the piston to the second position for performance of work; and
   e. bleeding pressure from the first piston side through a check valve after the piston has moved from the first position to at least the second position so that the piston may be moved back to the first position upon an increase in the external environment pressure.

4. A method according to claim 3 wherein the step of effecting a decrease in the external environment pressure comprises effecting movement of the cylinder into a space environment.

5. A method according to claim 4 includes selecting the location of the source of atmospheric pressure such that the atmospheric pressure at the source is at least one psia less than the atmospheric pressure at the site from which the cylinder is transported into a space environment.

6. A method according to claim 3 wherein the step of applying an atmospheric pressure to the first piston side includes providing plenum means in pressure communication with the first side of the piston and providing the atmospheric pressure in the plenum means.

7. A method according to claim 6 wherein the step of providing an atmospheric pressure in the plenum means includes establishing pressure communication between the plenum means and a source of atmospheric pressure and then sealing the plenum means to retain the trapped atmospheric pressure therein.

8. A valve for providing pressure communication between a pressure container and an external environment having pressure which is less than atmospheric pressure, the valve comprises: a valve body; chamber means in said valve body; piston means in said chamber means which piston means has first and second sides and is responsive to a pressure applied to said first side which is greater than the external environment pressure for movement from a first to a second position; plenum means for retaining an atmospheric pressure and applying the retained atmospheric pressure to said piston first side; means for applying the external environment pressure to said piston second side; first port means in said valve body interconnecting the pressure container and said chamber means, for pressure communication therebetween, at a location which is intermediate said piston means sides when said piston means is in said first position and when said piston means is in said second position; second port means in said piston means for providing pressure communication between said first port means and the external environment when said piston means is in said second position whereby pressure communication between the pressure container and external environment may be provided; means for closing the pressure container to pressure communication with the external environment when said piston means is in said first position; and means including check valve means for bleeding pressure from said plenum means after said piston means has moved to said second position to provide a pressure less than atmospheric pressure in said plenum means for effecting movement of said piston means back to said first position upon an increase in the external environment pressure to atmospheric pressure to seal the pressure container so that a pressure less than atmospheric pressure may be maintained therein as the external pressure is increased to atmospheric pressure.

9. A valve according to claim 8 wherein said bleeding means includes port means in said valve body interconnecting said check valve means and said chamber means for providing pressure communication therebetween, and means for providing pressure communication between said plenum means and said port means interconnecting said check valve means and said chamber means when said piston means is in a third position effected by a further decrease in external environment pressure after said piston means is positioned at said second position.

10. A valve according to claim 8 wherein the pressure container is a test container for testing the effects of a space environment on test specimens.

11. A valve according to claim 8 further comprises third port means interconnecting said plenum means and said pressure container for pressure communication therebetween and plug means for sealing said third port means whereby an atmospheric pressure may be retained in said plenum means.

12. A method for providing pressure communication between a pressure container and an external environment having a pressure less than atmospheric pressure, the method comprises the steps of:
   a. providing a valve having a member responsive to a pressure applied to a first side thereof which is greater than the external environment pressure for movement from a first position wherein the pressure container is closed to pressure communication with the external environment pressure and a second position to provide pressure communication between the external environment and the pressure container;
   b. applying the external environment pressure to a second side of the valve member;
   c. applying an atmospheric pressure to the first side of the valve member with the valve member in the first position and the external environment pressure equal to an atmospheric pressure;
   d. effecting a decrease in the external environment pressure such that the pressure difference between the pressure applied to the first and second sides of the valve member effects movement of the valve member to the second position; and
   e. bleeding pressure from the first valve member side through a check valve after the valve member has moved from the first position to at least the second position so that the valve member may be moved back to the first position upon an increase in the external environment pressure.

13. A method according to claim 12 wherein the step of effecting a decrease in the external environment pressure comprises effecting movement of the valve into a space environment.

14. A method according to claim 13 includes selecting the location of the source of atmospheric pressure such that the atmospheric pressure at the source is at least one psia less than the atmospheric pressure at the site from which the valve is transported into a space environment.

15. A method according to claim 12 wherein the step of applying an atmospheric pressure to the first side of the valve member includes providing plenum means in pressure communication with the first side of the valve member and providing the atmospheric pressure in the plenum means.

16. A method according to claim 15 further comprises the steps of effecting a further decrease in the external pressure to effect movement of the valve member to a third position before the step of bleeding pressure from the first valve member side, and effecting an increase in the external environment pressure to effect movement of the valve member to the first position to thereby close the pressure container to the external environment and maintain pressure less than atmospheric pressure in the pressure container as the external environment pressure is increased to atmospheric pressure.

17. A method according to claim 15 wherein the step of effecting a decrease in the external environment pressure comprises effecting movement of the valve into a space environment.

18. A method according to claim 12 wherein the step of providing atmospheric pressure in the plenum means includes establishing pressure communication between the plenum means and a source of atmospheric pressure and then sealing the plenum means to retain the trapped atmospheric pressure therein.

* * * * *